United States Patent [19]
Werner

[11] 4,330,906
[45] May 25, 1982

[54] FEED-THRU CONNECTION
[75] Inventor: Walter M. Werner, Downingtown, Pa.
[73] Assignee: AMP Incorporated, Harrisburg, Pa.
[21] Appl. No.: 128,994
[22] Filed: Mar. 10, 1980
[51] Int. Cl.³ ............................................. F16G 11/00
[52] U.S. Cl. .................................. 24/136 R; 248/63; 403/16
[58] Field of Search ................. 24/136; 174/40 R, 79; 248/63; 403/16, 368, 374; 339/273 R, 273 F

[56]  References Cited
U.S. PATENT DOCUMENTS

| | | | |
|---|---|---|---|
| 696,748 | 4/1902 | Rigby | 24/136 R |
| 1,504,087 | 8/1924 | Brady | 24/136 R |
| 2,146,575 | 2/1939 | Hefftner | 24/136 R |
| 2,220,203 | 11/1940 | Branin | 24/136 R |
| 2,433,324 | 12/1947 | Rogers | 24/136 R X |
| 2,835,949 | 5/1958 | Wengen et al. | 403/368 |
| 3,238,290 | 3/1966 | Ruple | 174/79 |
| 3,784,137 | 1/1974 | Eddens et al. | 248/63 |
| 3,951,504 | 4/1976 | Clark | 24/136 R |

*Primary Examiner*—Roy D. Frazier
*Assistant Examiner*—Peter A. Aschenbrenner
*Attorney, Agent, or Firm*—Allan B. Osborne

[57] ABSTRACT

The invention disclosed herein is a device which connects a transmission cable to a transmission tower. The device includes an elongated body, an insert member, and a wedge member. The cable extends through the body and is held securely between the insert member and wedge members within the body.

3 Claims, 3 Drawing Figures

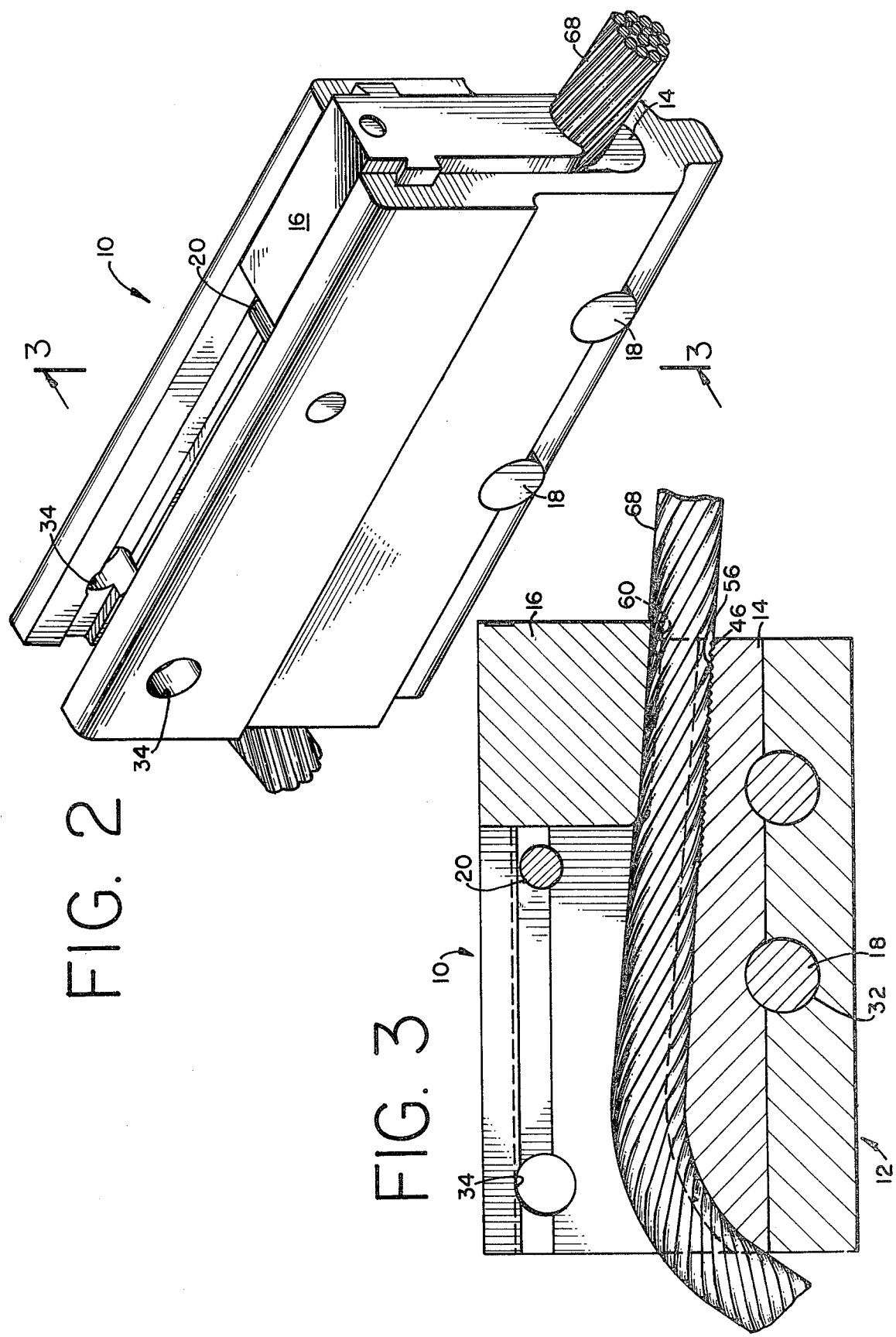

FEED-THRU CONNECTION

BACKGROUND OF THE INVENTION

1. The Field Of The Invention

This invention relates to the art of mechanically dead-ending high voltage cable to transmission towers.

2. The Prior Art

U.S. Pat. No. 3,163,904 discloses a device comprising an elongated body having a frusto-conical passage therethrough and a plurality of wedge-shaped jaws. A cable passing through the body is secured therein by the jaws being placed around the cable and being driven down the tapered passage. Means are provided for keeping the jaws in place.

U.S. Pat. No. 3,673,312 discloses a feed-thru dead end connector having the same function as the device disclosed in the present invention. The high voltage or transmission cable is fed through an elongated body and secured there by wedge-shaped jaws. The passage through the body is tapered. The jaws are driven down the passage into gripping engagement with the cable by a solid propellant.

SUMMARY OF THE INVENTION

The present invention provides a device to mechanically dead-end a transmission cable to transmission towers. The device includes an elongated body which is U-shaped in cross section. An insert member having an asymmetrical curved surface is secured in the floor of the body. A wedge member is slidably located in the body above the insert member after the cable has been laid through the body over the insert member. Thereafter, the wedge member is forcefully driven deeper into the body so as to trap the cable between its wedge-shaped surface and the insert member.

BRIEF DESCRIPTION OF THE DRAWINGS

FIG. 2 is a perspective view of the embodiment of FIG. 1 in an assembled condition with a transmission cable positioned therein; and FIG. 3 is a cross-sectional view in elevation taken along lines 3—3 in FIG. 2.

DESCRIPTION OF THE PREFERRED EMBODIMENT

Figure 1:
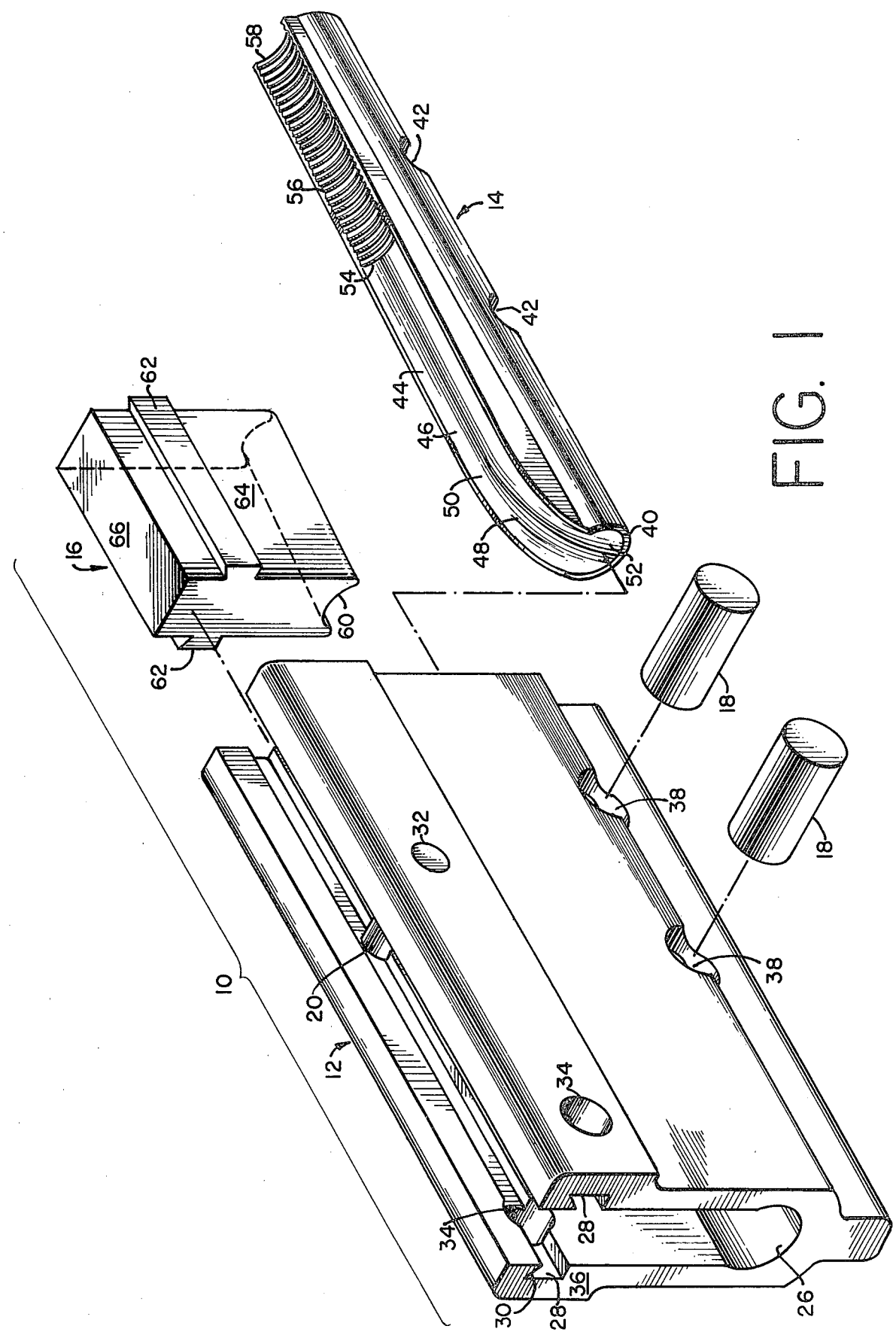
FIG. 1 is a perspective view of the preferred embodiment of the present invention showing the several components and their assembly.

The device of the preferred embodiment is referenced by numeral 10 throughout the drawings. In FIG. 1, the device is shown in a dissembled condition so that the structural features may be readily seen. The components of device 10 include body 12, insert member 14 and wedge member 16. Additionally there are pins 18 and 20.

Body 12 is preferably made from aluminum alloy (6061-T-6). The body is U-shaped with two parallel sidewalls 24 and a floor 26. As shown in the drawings, the body is opened at both ends as well as along the top.

A slot 28 is located in the inside surface of each sidewall a short distance below the top. The upper wall of each slot is bevelled as indicated by reference numeral 30.

Two sets of holes are provided in the upper region of the sidewalls. The first set of holes, designated by reference numeral 32, receive pin 20 which extends across the two sidewalls. The second set of holes, indicated by reference numeral 34, receive a bolt (not shown) for securing device 10 to a transmission tower cross arm (not shown). In order to accommodate slots 28, the upper region of sidewalls 22 are thicker with respect to the lower region. This thicker section is indicated by reference numeral 36 on the sidewall closest to the reader. The floor 26 is rounded as viewed from an end. Its diameter is greater than the distance between the sidewalls so that the effect is somewhat like an inverted key-hole.

Two holes 38 extends transversely through body 12 in its lower region, intersecting the floor as it crosses through. These holes receives pins 18.

Insert member 14 is preferably as long as body 12. The insert member's lower portion, designated by reference numeral 40 has a key-hole-like shape which complements floor 26 of body 12. Two arcuate or rounded grooves 42 cuts across the lower portion. Pins 18 passes through these grooves locking the insert member in body 12 as will be seen later on.

The upper surface 44 of insert member 14 has an upwardly open arcuate channel 46 extending therealong from first end 52 to second end 58. Further, the upper surface and channel is asymmetrically curved axially with one section 48 being curved rather sharp; i.e., about sixty-five degree arc. The apex 50 of the convex curve is thus close to first end 52 of the insert member. The remaining section of the curve, extending from apex 50 to second end 58 is shallow; i.e., it has a rise of about 0.087/inch with respect to the bottom surface. A large portion of channel 46 in section 54 has a plurality of transverse serrations 56. These serrations extend out to the insert member's second end 58.

Insert member 14 is preferably made from a die castable aluminum alloy.

Wedge member 16 is a generally rectangular block whose lower surface 60 is channeled and is beveled or tapered from one end to the other. The angle of the taper is identical to the angle of side 54 of channel 46 on insert member 14.

Two rails 62 are located on the wedge member; one on either side 64 and both are spaced below the top surface 66. The upper wall of each rail is angled or beveled so that the rails are conformably received in slots 28 in body 12. The width of wedge member 16, excluding the rails, is only very slightly less than the distance between the sidewalls.

The material wedge member 16 is made from is preferably a die castable aluminum alloy.

The utility of device 10 will now be explained. Reference will be made to FIGS. 2 and 3 primarily.

Insert member 14 is slid into body 12 along floor 26, and is secured therein by driving pins 18 through holes 38 and grooves 42 located in the lower surface of the insert member. FIG. 3 shows the positioning of these components. Thereafter a cable 68 is laid through body 12 and along channel 46 of insert member 14.

One of two methods may now be followed. In one method wedge member 16 is placed into body 12 with rails 62 riding in slots 28. Driving means (not shown) are employed to drive the wedge member deep into body 12 so that cable 68 is securely trapped between the serrated portion of channel 46 and the channeled lower surface 60 of the wedge member. This is shown in FIGS. 2 and 3. A bolt or clevis pin (not shown) is now positioned in holes 34 and the device 10 is secured to the transmission tower thereby.

A second method would be to secure the body 12 with the insert member 14 and cable 68 in place to the tower. Cable 68 is then pulled through the body along channel 46 until the proper tension on it is reached. At that time wedge member 16 is driven into place in body 12 to trap the cable as explained above.

The wedge member may be driven into body 12 by hammering, or preferably by use of a propellant powered tool (not shown) such as sold by AMP, Inc., of Harrisburg, Pa. under the trade name of AMPACT tool. In using this tool its front end is placed around pin 20 and its ram on the end of the wedge member which is adjacent that end of body 12. As noted above, the wedge member is slid into the body by hand as far as possible. Upon striking the end of the AMPACT tool with a hammer, the propellant within is ignited which then drive the ram forward. The ram drives the wedge member into the body to secure the cable within as noted above. Thereafter the tool and pin 20 may be removed. The more steeply inclined side of channel 46 on the insert member avoids cable 68 from making sharp bends. This is shown in FIGS. 2 and 3. Thus greater tension may be applied to the cable.

It is to be understood that the forms of the invention shown and described herein are but preferred embodiments thereof and that various changes and modifications can be made therein without departing from the spirit or scope of the invention.

What is claimed is:

1. A device to connect a cable to a transmission tower or the like, comprising:
    a. an elongated U-shaped body having a semi-rounded floor and parallel sidewalls with longitudinally extending slots located in the interior surface of the sidewalls and opening out at one end of the body;
    b. an insert member positioned in the floor of the body and having a longitudinally curved, upwardly facing surface with a cable-receiving channel extending along the length thereof; and
    c. a wedge member with laterally projecting rails on each side and a tapered, channel shaped lower surface, said wedge member being adapted to be positioned at one end of the body member with the rails slidably received in the slots and the tapered lower surface facing the insert member and to be forcefully driven into the body so that a cable which may be laying along the cable-receiving channel will be immovably trapped between the wedge member and insert member.

2. The insert member of claim 1 wherein the curved surface is axially asymmetrical with one section of the curved surface on one side of the apex having a steeper slope than the section of the curved surface on the other side of the apex.

3. The insert member of claim 2 wherein the cable-receiving channel has serrations along a portion thereof.

* * * * *